US007222081B1

(12) United States Patent
Sone (10) Patent No.: US 7,222,081 B1
(45) Date of Patent: May 22, 2007

(54) SYSTEM AND METHOD FOR CONTINUOUS DELIVERY SCHEDULE INCLUDING AUTOMATED CUSTOMER NOTIFICATION

(75) Inventor: Masahiro Sone, Raleigh, NC (US)

(73) Assignee: Fujitsu Limited (JP)

( * ) Notice: Subject to any disclaimer, the term of this patent is extended or adjusted under 35 U.S.C. 154(b) by 835 days.

(21) Appl. No.: 09/684,859

(22) Filed: Oct. 5, 2000

(51) Int. Cl.
*G06F 17/50* (2006.01)
(52) U.S. Cl. .......................................... 705/7
(58) Field of Classification Search ............... 705/8, 705/7
See application file for complete search history.

(56) References Cited

U.S. PATENT DOCUMENTS

| | | | | |
|---|---|---|---|---|
| 5,043,908 | A | 8/1991 | Manduley et al. | 364/478 |
| 5,317,699 | A | 5/1994 | Sugita et al. | 395/325 |
| 5,469,362 | A | 11/1995 | Hunt et al. | 364/478 |
| 5,524,077 | A | 6/1996 | Faaland et al. | 364/402 |
| 5,696,948 | A | 12/1997 | Cruz et al. | 395/550 |
| 5,706,486 | A | 1/1998 | Cruz et al. | 395/556 |
| 5,751,245 | A | 5/1998 | Janky et al. | 342/357 |
| 5,765,167 | A | 6/1998 | Kiuchi et al. | 707/200 |
| 5,809,479 | A * | 9/1998 | Martin et al. | 705/11 |

FOREIGN PATENT DOCUMENTS

| | | |
|---|---|---|
| EP | 0 845 747 A2 | 6/1998 |
| WO | WO9616365 * | 5/1996 |

OTHER PUBLICATIONS

Kennedy, Roadnet Technologies Announces Release of MOBILECAST™ Wireless Dispatch and Delivery Solution; Product Enables Breakthrough Customer Service, Pr Newswire, New York, Oct. 29, 1999 [PROQUEST].*
Truck Fleet Management, Technology Browser, Truck Fleet Management, Norwalk, vol. 78, Issue 5, May 2000, p. 56-57 [PROQUEST].*
Shah, FedEx Readying Product Suite to Provide Package Tracking, Electronic Buyers' News, Issue 1228, Sep. 11, 2000 ([EBSCO].*

(Continued)

*Primary Examiner*—Romain Jeanty
(74) *Attorney, Agent, or Firm*—Christie, Parker & Hale, LLP.

(57) ABSTRACT

A system and method for continuously monitoring and updating delivery schedules based on completed deliveries and customer modifications. A delivery scheduling computer stores and updates delivery schedule information, notifying the customer prior to a scheduled delivery of an estimated time of delivery. The notification is made to a customer's PC, browser-based client, hand-held computer or set-top box, or by conventional communication methods such as a telephone, pager, or cellular phone. If the customer desires to change the time or location of the delivery, the customer transmits a delivery change request and the schedule is modified accordingly. Employees use a hand-held computer or a browser-based client to receive updated delivery schedule information, as well as to transmit a delivery completion message to the delivery scheduling computer. The message includes an actual delivery time which the delivery scheduling computer uses to update the estimated delivery times of the remaining deliveries.

36 Claims, 7 Drawing Sheets

OTHER PUBLICATIONS

Business Editors, Descartes-Versatile Solution for Home Delivery and Consumer Direct Gains Rapid Adoption by Internet Grocers, Business Wire, New York, Jul. 11, 2000 [PROQUEST].*

Boulton et al., United Parcel Service: Moving at the Speed of Business, Boulton and USW, copyright 1999 [GOOGLE].*

Business Wire, ShopLink Selects Descartes' e-Business Home Delivery Solution to Optimize Service and Delivery for the Online Grocery and Household Service, Descartes Press Release, Business Wire, Aug. 6, 1999 [GOOGLE].*

CCN Matthews, The Descartes Systems Group Unveils Revolutionary Web-Based Delivery Management System to Monitor the Flow of Products Throughout the Entire High-Tech Supply Chain, Canadian Corporate News, Oct. 13, 1998 [GOOGLE].*

Fleet Equipment, MobileCast Bundled Wireless Solution for Distribution, Fleet Equipment, vol. 24, Issue 5, May 1998, p. 79 [EBSCO].*

UPS, UPS Introduces On-the-Spot Tracking, UPS Press Release, Jun. 14, 1999 [GOOGLE].*

Descartes, PeopleSoft to Extend Existing Order Management Solution with Descartes' e-Business Solutions, Descartes Press Release. Aug. 31, 1999, [GOOGLE].*

Bishop et al., ClickSchedule: Fulfilling E-Commerce Through Online Scheduling, Aberdeen Group, Inc., Sep. 21, 1999, [GOOGLE].*

UPS, UPS OnLine® World Link Delivers FREE Internet Access to Web Shipping and Digital Document Delivery Solutions, UPS Press Release, Oct. 4, 1999 [GOOGLE].*

Business Editors, Arrow Establishes Internet Business Group, Business Wire, Jul. 15, 1999 [PROQUEST].*

Roadnet Technologies, MobileCast Bundled Wireless Solution for Distribution, Fleet Equipment, vol. 24, Issue 5, May 1998, pp. 79 [EBSCO].*

* cited by examiner

| CUSTOMER ID ⟋50a | CUSTOMER NAME ⟋50b | DELIVERY ADDRESS ⟋50c | DELIVERY SEQUENCE ⟋50d | EST. DEL. TIME ⟋50e | ACTUAL DEL. TIME ⟋50f | STATUS ⟋50g | PRIOR NOTIFY ⟋50h |
|---|---|---|---|---|---|---|---|
| 001 | JOHN DOE | 102 STATE ST. | 3 | 2:15 PM | | W | 30 MIN. 213-111-111 |
| 002 | JANE DOE | 21 MAIN ST. | 1 | 1:00 PM | 1:10 PM | D | 30 MIN. 310-111-111 |
| 003 | AMY DOE | 100 STATE ST. | 2 | 1:45 PM | | P | 45 MIN. 213-222-2222 |
| 004 | LESLIE DOE | 100 STATE ST. | | | | B | 45 MIN. LD@ABC.COM |

SYSTEM AND METHOD FOR CONTINUOUS DELIVERY SCHEDULE INCLUDING AUTOMATED CUSTOMER NOTIFICATION

FIELD OF THE INVENTION

The present invention relates generally to delivery scheduling systems, and more particularly, to a system and method for continuously monitoring and updating a delivery schedule, and notifying a customer of a scheduled delivery.

BACKGROUND OF THE INVENTION

The expansion of personal computers into homes of average consumers has also expanded the usage of the Internet by such consumers, and with it, has opened a new avenue of shopping, specifically, Internet shopping. The Internet, and specifically, the World Wide Web, provides convenient purchasing abilities from one's home, with a simple click of a mouse. Thus, practically anything imaginable, from groceries to a car, may now be purchased via the Internet.

However, unlike conventional shopping where a customer visits a store, purchases an item, and leaves the store with the item purchased, a person shopping over the Internet does not leave with the goods purchased when he or she logs off the computer. The goods purchased must be processed and delivered to the customer via a delivery service.

Other non-Internet companies, such as mail-order companies, also rely heavily on delivery services to distribute items purchased by consumers. Even conventional retail stores provide delivery services to customers for items that are not easily transportable, such as furniture, appliances, and the like.

Thus, the volume of items delivered by delivery services like U.S. Postal Service, United Parcel Service, Federal Express, and the like, has increased substantially, and with it, the pressure to be efficient and prompt in making the scheduled deliveries. Such efficiency and promptness is beneficial to both the delivery services as well as to customers, increasing customer satisfaction and encouraging purchase of items via the Internet.

Efforts have been made in the prior art to increase efficiency of certain delivery services. For instance, there exists in the prior art a self-monitoring mail delivery system wherein mail is tracked as it passes through multiple delivery stages. A schedule is created of expected arrival times at each stage. Should a mail piece not arrive on time, the system is alerted to initiate a search for the late or missing mail piece, or to take other corrective action, such as expediting delivery of late pieces. A data center monitors the operations and provides management information to help enhance deliveries.

The prior art also discloses a method and apparatus for monitoring the dispatching of scheduled mail, as well as for coordinating the receipt of new mail with common carrier dispatch schedules. Specifically, the prior art discloses a methodology by which mail is organized in terms of zip codes so that a mail run is able to arrive at a dispatch station "just-in-time" to be loaded onto a common carrier's vehicle. The prior art also discloses a post run analysis system which reviews the results of a mail production run in order to determine how effectively mail production was scheduled or whether certain mail production runs were completed too late in to conveniently meet the common carrier dispatch schedules. If this is the case, the mail production schedule is revised.

Despite efforts in the prior art, delivery services are still inconvenient for average consumers for several reasons. First, customers usually have no idea as to when a delivery is to be made, resulting in missed deliveries if there is no-one to receive the delivered merchandise. A missed delivery is not only detrimental to the customer, but also detrimental to the delivery service that would have re-directed the time and the resources expended to making a delivery which could have been successful.

Even if an estimated time of delivery is provided, such estimation is crude and not very accurate. Thus, for many items expected for delivery, customers end up postponing or canceling appointments, errands, and/or other duties to remain at the delivery location so that a delivery is not missed.

A second drawback to existing delivery services is that delivery service schedules are inflexible from the point of view of the customers. Once an item ordered is on the process of being delivered, the customer has no ability to change the delivery time, or request that the delivery be made to a different location.

Accordingly, there is a need for a delivery schedule system which continuously tracks delivery schedule times and notifies customers of a scheduled delivery prior to the making of a delivery. If the customer is not at home, or wants to change the delivery time or location, the system should allow such change and modify the delivery schedule accordingly.

SUMMARY OF THE INVENTION

The present invention addresses and alleviates the above-mentioned deficiencies associated with the prior art. More particularly, the present invention comprises a system which continuously monitors and updates delivery schedules based on completed deliveries and modifications made by the customers.

In accordance with one aspect of the invention, the delivery scheduling and updating system includes a delivery scheduling computer, a user computer, and a network linking the delivery scheduling computer to the user computer. The delivery scheduling computer electronically stores and updates delivery schedule information. Prior to a scheduled delivery, the delivery scheduling computer notifies the customer of an estimated time of the delivery. The customer receives the delivery notification via the user computer. If the customer desires to make a change to the delivery, such as the time of the delivery or the delivery location, the customer uses the computer to transmit a delivery change request. A set of user application modules associated with the delivery scheduling computer and the user computer allows the user to view the delivery notification and enter the delivery change request.

In another aspect of the invention, the customer receives delivery notifications and/or enters delivery change requests via a telephone, cellular phone, pager, or a set-top box.

In a further aspect of the present invention, system also includes an employee computer for receiving updated delivery schedule information from the delivery scheduling computer. The employee then makes deliveries according to the delivery schedule received. Upon completion of a scheduled delivery, the employee uses the employee computer to transmit a delivery completion message to the delivery scheduling computer. The delivery completion message includes an actual delivery time which the delivery scheduling computer uses to update the estimated delivery times of the remaining deliveries. In this way, their delivery times may be more accurately determined.

It will be appreciated that the system and method according to the present invention provide a significant improvement in the quality and efficiency of delivery services. Customers no longer need to wait at home for a scheduled delivery which may or may not be made on time. If the customer is not at the scheduled delivery location when notification of the delivery is made, the customer may alter the time or location of the delivery. Thus, delivery services no longer have to make unsuccessful delivery efforts, and may reorganize their schedules and times to ensure the most efficient and successfully delivery.

BRIEF DESCRIPTION OF THE DRAWINGS

These and other features, aspects and advantages of the present invention will be more fully understood when considered with respect to the following detailed description, appended claims and accompanying drawings wherein:

FIG. 2 is a schematic layout diagram detailing the organization of delivery schedule information maintained by the delivery scheduling computer of FIG. 1;

DETAILED DESCRIPTION OF THE INVENTION

In general terms, the present invention is directed to a delivery schedule and notification system for use by delivery services such as the U.S. Postal Service, United Parcel Service, Federal Express, courier services, retail delivery services, and other types of local and international delivery services.

Figure 1:
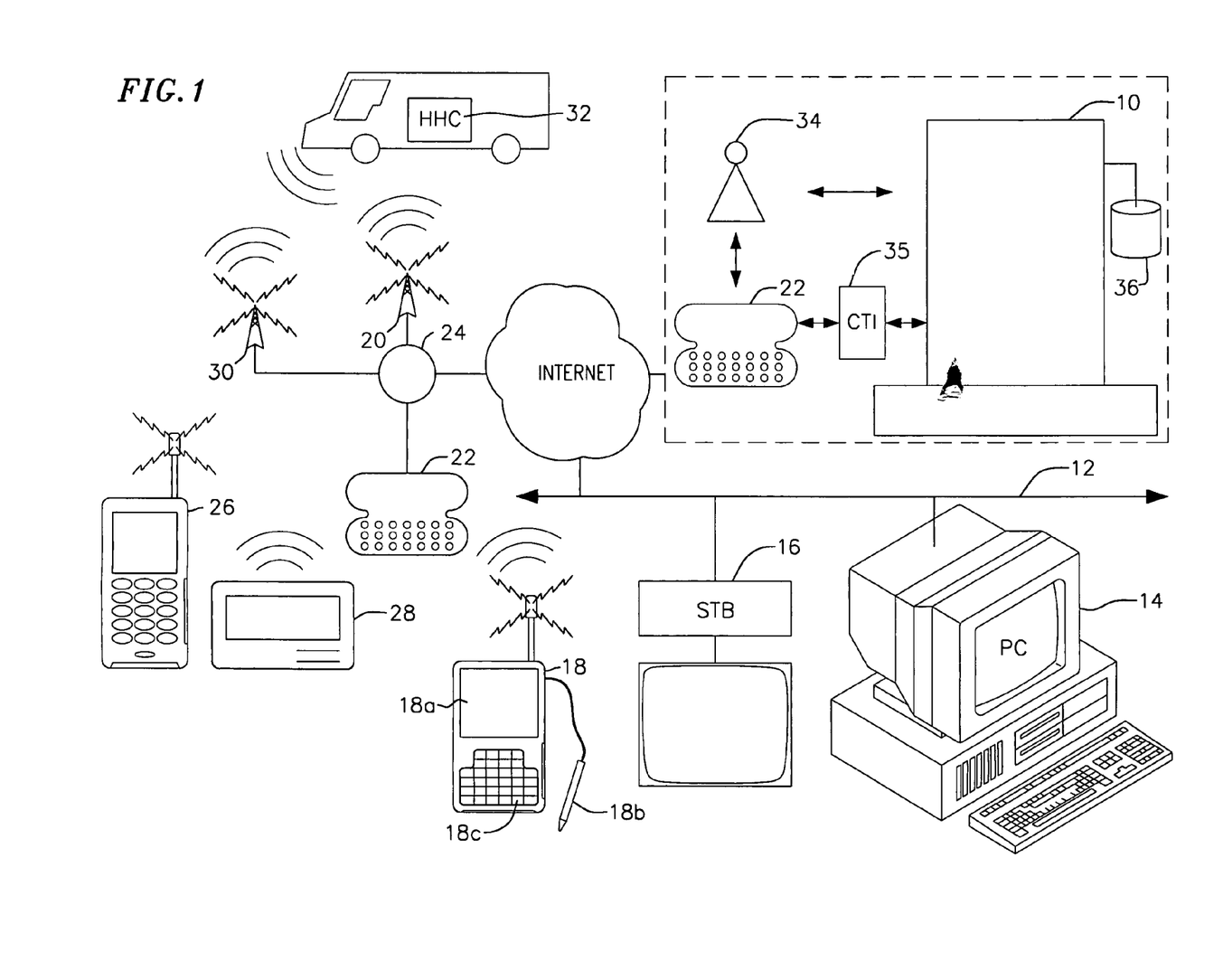
FIG. 1 schematic block diagram of an exemplary delivery schedule and notification system including a delivery scheduling computer.

FIG. 1 depicts a schematic block diagram of an exemplary delivery schedule and notification system. The system comprises a delivery scheduling computer 10 for creating and updating one or more delivery schedules. The delivery scheduling computer 10 includes a mass storage device 36 for storing a database of delivery schedule information. The mass storage device may take the form of a hard disk drive or drive array.

The delivery scheduling computer 10 communicates with remote customers and delivery employees over a wide area network, such as the Internet, using wired communication or RF communication. According to one embodiment of the invention, the delivery scheduling computer 10 uses an Internet connection 12 for communicating with a remote customer's personal computer 14 or set-top box 16. The Internet connection 12 might comprise telephone lines, ISDN lines, DSL lines, cable connection and the like.

Customers and delivery employee also have access to hand-held computers ("HHCs") 18, 32 that transmit and receive information to and from the delivery scheduling computer 10. The HHCs 18, 32 include wireless modems (not shown) which communicate with a wireless network service 20 through RF signals. The HHCs 18, 32 may also include a conventional phone modem for wired communication with the delivery scheduling computer 10. In addition, the HHCs 18, 32 include a touch screen 18a and a stylus 18b or tiny QWERTY keyboard 18c for allowing user input into the HHC. The HHCs 18, 32 may alternatively be replaced with a hand-held device acting as a mobile, wireless monitor receiving scheduling data from the delivery scheduling computer 10.

In yet another embodiment of the invention, the HHCs 18, 32 are replaced with a browser-based client having Internet connection capabilities. Customers and employers use the browser-based client to log into the delivery scheduling computer 10 and access applications and information directly from the mass storage device 36.

The delivery scheduling computer 10 also transmits and receives information related to the delivery schedules to and from the remote customers via a conventional telephone 22 which communicates with a conventional telephone network 24, or a wireless phone 26 or pager 28, which communicates with a cellular telephone network 30. The delivery scheduling computer 10 includes an automatic dialing routine and voice synthesizer for automatically initiating telephonic communication with the customer. Alternatively, a customer service representative 34 with access to the delivery scheduling computer 10 manually initiates the telephonic communication. In yet another alternative, a separate server referred to as a computer telephony integration (CTI) server 35 includes logic for automatically receiving and processing the telephone calls.

Once communication between the delivery scheduling computer 10 and a remote customer is established via any of the above described methods, the delivery scheduling computer 10 transmits relevant portions of the delivery schedule information stored in the mass storage device 36 to the remote customers. This information includes, for instance, an estimated time in which delivery is to be made to the customer. In this way, customers are alerted of a delivery prior to its attempt.

In addition, a customer may request changes to the delivery, such as the time of the delivery and the delivery location. Upon receipt of such a request, the delivery scheduling computer 10 calculates the costs associated with making the change, typically based on a mileage increase. The increased cost is communicated to the customer in order to confirm that the customer will accept the additional cost. Upon acceptance of the additional cost, the delivery scheduling computer 10 modifies the delivery schedule to reflect the change.

The delivery employee makes deliveries according to the delivery schedule received from the delivery scheduling computer 10. The initial download of the delivery schedule might be wired or wireless. Thereafter, any updates to the delivery schedule while the employee is on the road is transmitted via RF signals.

Alternatively, if the delivery employee uses the browser-based client instead of the HHC 32, the employee establishes a connection to the delivery scheduling computer 10 and accesses the delivery schedule data directly from the computer's mass storage device 36. The browser displays the up-to-date delivery schedule as the changes are made in the mass storage device 36.

Upon completion of a particular delivery on the delivery schedule, the delivery employee transmits to the delivery scheduling computer 10 a delivery completion message including the actual time of the delivery.

According to one embodiment of the invention, the HHC's internal clock time-stamps the delivery completion message prior to its transmission to the delivery scheduling computer 10, and the actual delivery time is deemed to be the time stamped on the delivery completion message. In an alternative embodiment, the employee manually enters the actual time of delivery when transmitting the delivery completion message.

Upon receipt of a delivery completion message, the delivery scheduling computer 10 recalculates the estimated delivery times of the remaining deliveries and transmits a modified schedule information to the delivery employee. Thus, estimated delivery times for the remaining deliveries can be more accurately predicted. Modifications to the schedule information due to the changes requested by the customer are also transmitted to the employee.

FIG. 2 is a schematic layout diagram detailing the organization of delivery schedule information in the mass storage device 36. The schedule information is maintained in a delivery schedule table 50 as a series of scheduled delivery entries. One or more tables 50 may be maintained for different delivery routes, employees, days of the week, and the like.

Each delivery entry includes a unique customer identifier (customer ID) 50a. The customer ID 50a is associated with a particular customer name stored in a customer name field 50b. Each delivery entry further includes a delivery address field 50c for storing the address to which the delivery is to be made. A delivery sequence field 50d indicates the order in which the delivery is to be made. The order of the deliveries are calculated based on an estimated delivery time stored in an estimated delivery time field 50e. The actual time of the delivery is stored in an actual delivery time field 50f.

In addition to the above, each delivery entry also includes a status field 50g and a prior notify field 50h. The status field 50g indicates the status of the delivery as waiting (W), done (D), in progress (P), or bring-back (B). If the delivery employee is at a particular delivery location and is currently making the delivery at the location, the status for the delivery entry is noted as being "in progress." The other deliveries waiting to be executed are noted as "waiting." Once the delivery is finalized, the status of the "in progress" delivery entry is changed to "done." A "bring-back" status indicates that an originally scheduled delivery has been canceled (e.g. because the customer has opted to pick-up the delivery), and thus, the product is to be brought back to the central office.

The prior notify field 50h indicates the amount of prior notice requested by the customer before a delivery is attempted. If no such request has been made, a default time is entered (e.g. 30 minutes). The prior notify field further includes a telephone number, pager number, e-mail address, and the like, where notification of a delivery is to be made.

Figure 3A:
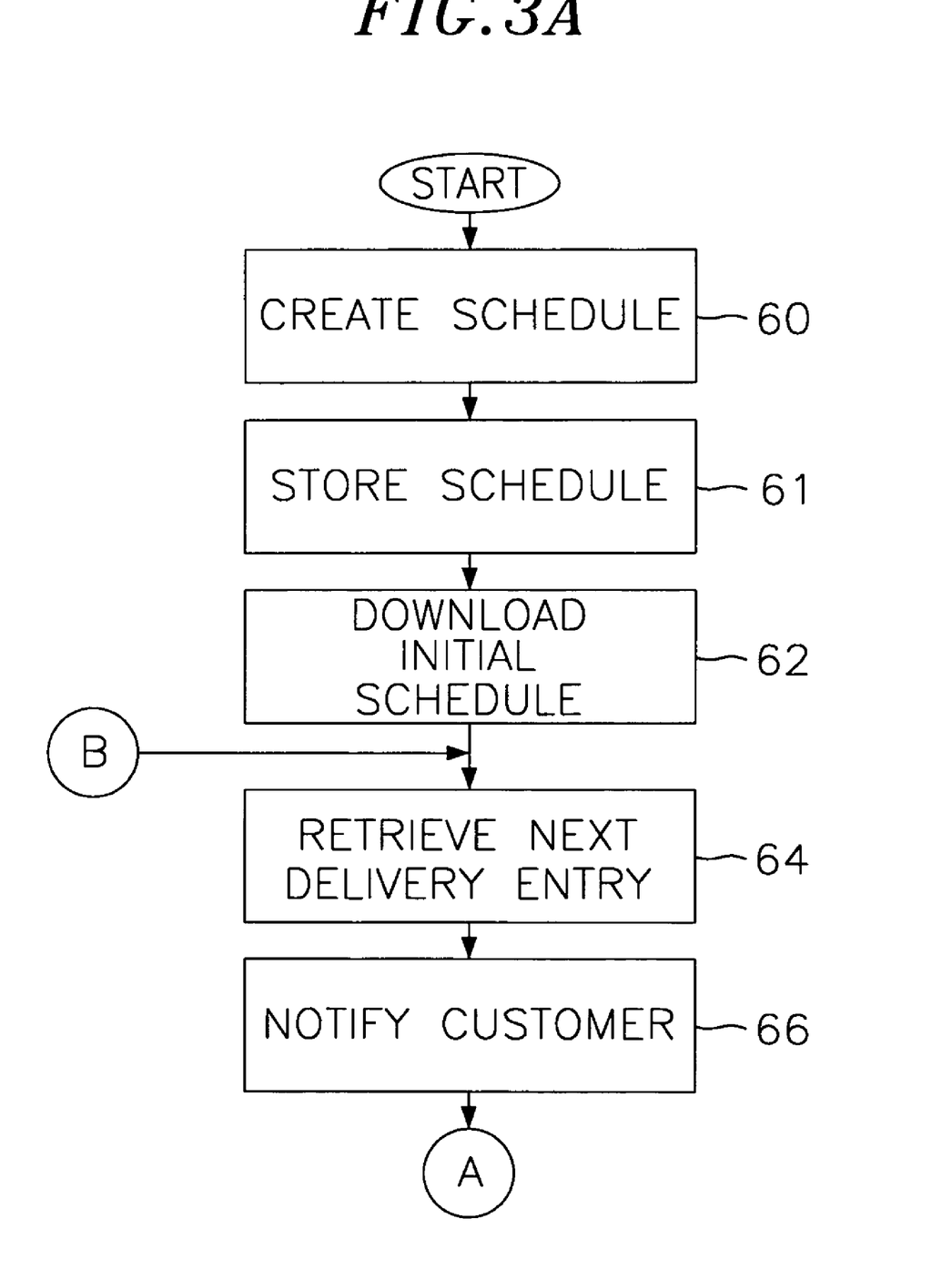
FIGS. 3A–3B are exemplary flow diagrams of a delivery scheduling and update process executed by the delivery scheduling computer of FIG. 1.
Figure 3B:
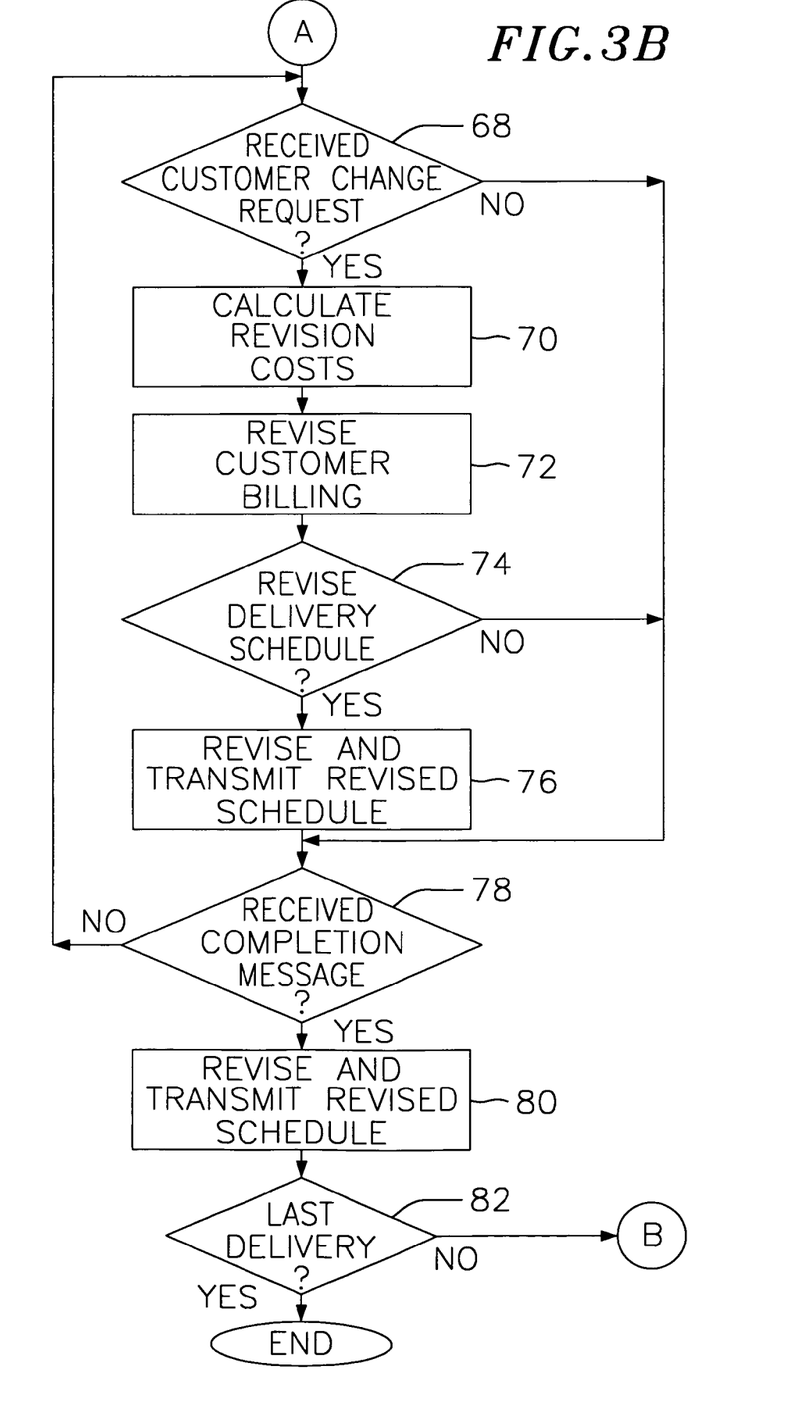

FIGS. 3A–3B are exemplary flow diagrams of a delivery scheduling and update process executed by the delivery scheduling computer 10 of FIG. 1. The process is described in terms of a computer program. The program starts and in step 60, creates a delivery schedule for a particular day and region. In doing so, the delivery scheduling computer 10 may present to the user a set of available times that the customer may choose for delivery. For instance, a customer ordering groceries via the Internet, may, at the time the order is placed, have a choice of a delivery day, as well as a set of delivery times on that day (e.g. between 9:00 am and 12:00 pm, or between 3:00 pm and 6:00 pm.) The present invention is also applicable, however, to situations where a customer does not or cannot specify a particular date or time of delivery, such as when the delivery is to be made as soon as the delivery order is received by the delivery service provider (e.g. packages sent by UPS, U.S. Mail, and the like).

The delivery scheduling computer 10 creates a delivery schedule based on one of the typical routing algorithms known in the art. According to one embodiment of the invention, the delivery schedule is based on a shortest-path algorithm which organizes the deliveries so that a total amount of mileage traveled by the delivery employee is minimized. In this regard, the program takes a list of deliveries to be made for the selected route, and determines the distance from the delivery headquarters to each delivery location. The program selects the delivery with the shortest mileage from the delivery headquarters as the first delivery. The program then computes the distance from the first delivery location to the remaining delivery locations, and selects the delivery with the shortest mileage as the second delivery. This process continues until all the deliveries have been assigned a delivery sequence. The shortest-path algorithm, therefore, creates a delivery sequence which will make the deliveries as efficient as possible. A person of skill in the art should appreciate, however, that other known routing algorithms may also be used to create the routing schedule without departing from the scope and spirit of the present invention.

The program next computes the estimated delivery times for each of the deliveries based on the assigned delivery sequence. In its simplest form, an estimated delivery time is calculated based on a distance to a particular delivery location from a destination location. The delivery predictions may be made more accurate by taking into account other factors, such as the amount of time expected to be spent at each delivery location, rush hour considerations, amount of deliveries to be made at each location, and the like.

The program next decides if any of the deliveries have been requested to be delivered within a certain delivery period. If such requests have been made, and the estimated delivery time is not within the specified delivery period, the program selects the deliveries whose estimated delivery times are not within the specified delivery periods and moves them up or down in the sequence of deliveries as necessary. The estimated delivery times of the deliveries affected by the change in sequence are also recalculated accordingly.

Once a delivery schedule has been created, the delivery schedule information is entered into the scheduling table 50 (FIG. 2) in step 61, and stored in the system's mass storage device 36. The status field 50g of all the deliveries are further initialized with a "waiting" status indicator. In step 62, the delivery schedule is downloaded to the delivery employee's HHC 32, and the employee may now begin to make the scheduled deliveries.

The program constantly monitors the delivery schedule during the delivery process and makes appropriate notifications and updates to the delivery schedule. Accordingly, the program, in step 64, retrieves a delivery entry from the scheduling table 50 for which a delivery is to be made. The status of this delivery is changed to "in progress" and stored in the delivery entry's status field 50g. In step 66, the program notifies the customer of the delivery prior to the making of the delivery. In doing so, the program examines the prior notify field 50h for the delivery for determining how far in advance the notification should be made. The notification is made by initiating automatic or manual telephonic communication with the customer's telephone, cellular phone, or pager. Alternatively, the notification is transmitted to the customer's HHC 18, PC 14, or STB 16 via wireless or wired communication. For example, the notification may be sent to the customer's e-mail address, or displayed on a ticker on the customer's browser.

In step 68, the program inquires whether a customer has placed a request for a different delivery time or location. The customer may also indicate that no delivery is necessary, and that the customer will do a pick-up of the goods to be delivered from the delivery headquarters. A customer might make such a request upon receipt of a delivery alert. Alternatively, the customer may access the estimated delivery schedule time via the Internet, telephone, or other communication means, prior to the receipt of the delivery alert. For example, a customer using the browser-based client may at any time log onto the delivery scheduling computer 10 and view a current estimated delivery time. If the delivery is still waiting to be delivered, the customer may then submit a request to change a delivery parameter.

If the customer has requested to change a delivery, the program, in step 70, calculates the cost change to make the new delivery. The cost change is generally based on the mileage increase due to the request. Alternatively, if no mileage increase is caused by the request, a flat service fee might be assessed to process the request. In yet another alternative, the change may be processed free of charge for a predetermined number of times for frequent shoppers, such as up to three times a month.

In step 72, the program modifies the customer's bill to reflect the change in the cost. In step 74, the program determines if the request has created a change in the delivery schedule. If the answer is YES, the program, in step 76, revises the schedule table 50 and transmits the revised schedule to the delivery employee. In this regard, the program first determines if the change is in the delivery time or location. If the change is in the delivery time, the program moves the delivery up or down in the delivery sequence and re-calculates the estimated delivery times for the remaining deliveries accordingly.

If the change is in the delivery location, the program again re-calculates the estimated delivery time for the changed delivery as well as the remaining deliveries. The program further calculates the increase in total mileage that the delivery employee will need to travel due to the change of location.

If the customer has instead indicated that he or she is to do a pick-up of the goods, the status of the entry for the delivery is changed to "bring-back." Such a delivery entry is no longer assigned a delivery sequence number, an estimated delivery time, nor an actual delivery time. The estimated delivery times of the remaining deliveries are thus updated accordingly.

According to one embodiment of the invention, the calculation of the revised costs, the revision of the customer billing, and the revision of the delivery schedule table 50 occurs only if the customer accepts the increased costs.

The program further inquires in step 78 whether a delivery completion message was received by the delivery employee. An employee transmits such a message after a delivery with a status of "in progress" has been completed. As discussed above in conjunction with FIG. 1, the delivery completion message includes an actual delivery time, and is transmitted using the employee's HHC 32 or browser-based client. It is noted, however, that any other traditional means of communication, such as a two-way radio or telephone, may be utilized instead of the HHC 32 to submit the delivery completion message.

If a completion message was received, the program, in step 80, modifies the delivery schedule in the schedule table 50 and transmits the updated schedule to the delivery employee. The update may be as simple as changing the status of the delivery to "done" from "in progress." However, if the delivery was not completed by the estimated delivery time, the system re-calculates the remaining delivery times based on the actual delivery time.

In step 82, the program inquires if the last delivery has been made. If the answer is YES, the program ends. Otherwise, the program returns to step 64 to retrieve the next delivery entry from the delivery schedule 50.

Figure 4:
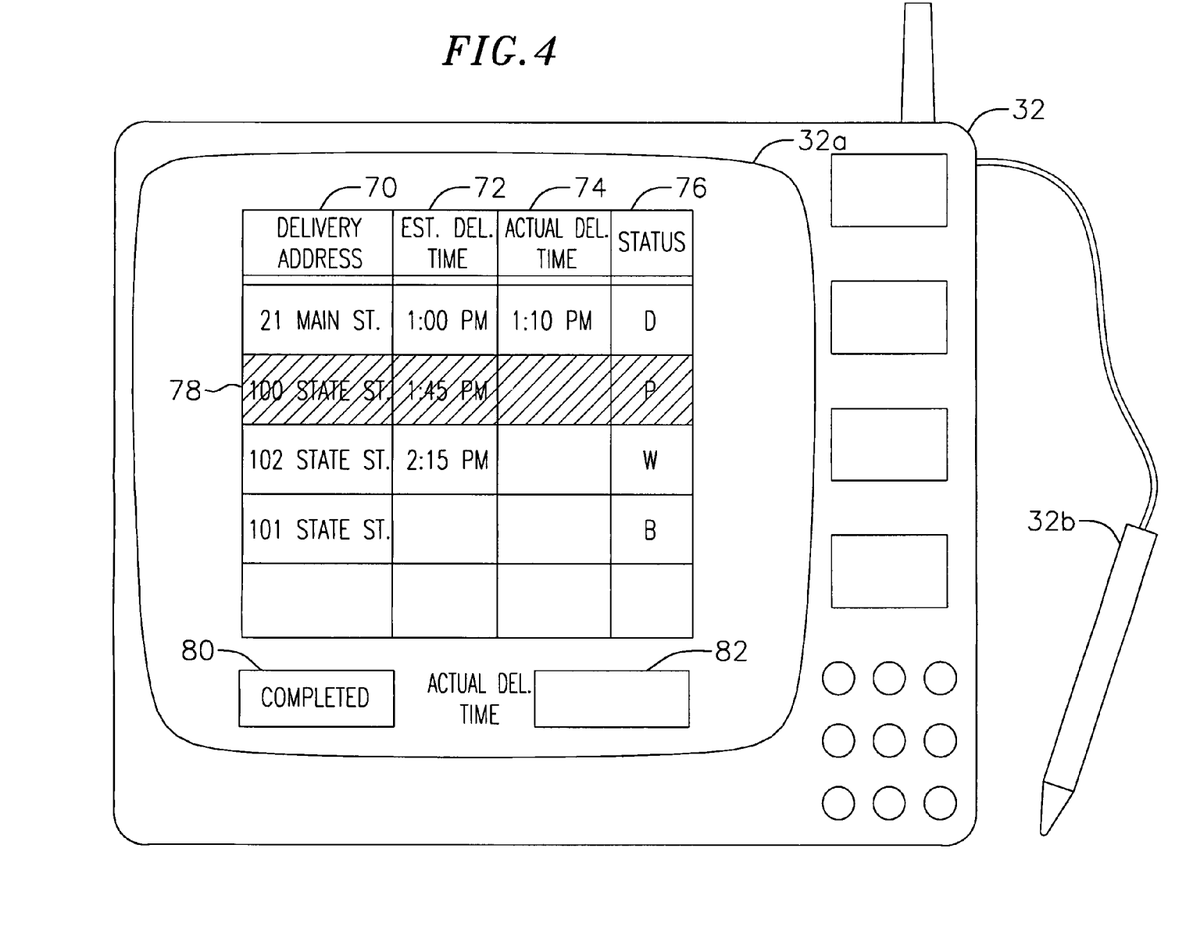
FIG. 4 is an illustration of a screen with delivery schedule information for a delivery employee.

FIG. 4 is an illustration of a screen 32a of a delivery employee's HHC 32 or browser-based client. The screen 32a displays the updated delivery schedule as stored in the scheduling table 50 and transmitted by the delivery scheduling computer 10. The screen 32 displays a delivery address 70, an estimated delivery time 72, an actual delivery time 74, and a delivery status 76. The delivery schedule is listed according to its delivery sequence (first delivery listed first, second delivery listed second, etc.)

After a delivery has been made, the delivery employee selects the particular delivery listing 78 using, for instance, a stylus 32b as the source of the input. The employee then uses the stylus 32 to actuate a "Completed" button or icon 80 on the screen 32a to transmit a delivery completion message. The HHC's or browser-based client's internal clock time-stamps the message, and transmits it to the delivery scheduling computer 10 for re-calculating the delivery times of the remaining deliveries.

In an alternative embodiment, the employee manually enters the actual time of the delivery in an input area 82 when transmitting the notification of a completed delivery. This may be desirable if the employee wants to wait before entering the delivery completion message.

Figure 5:
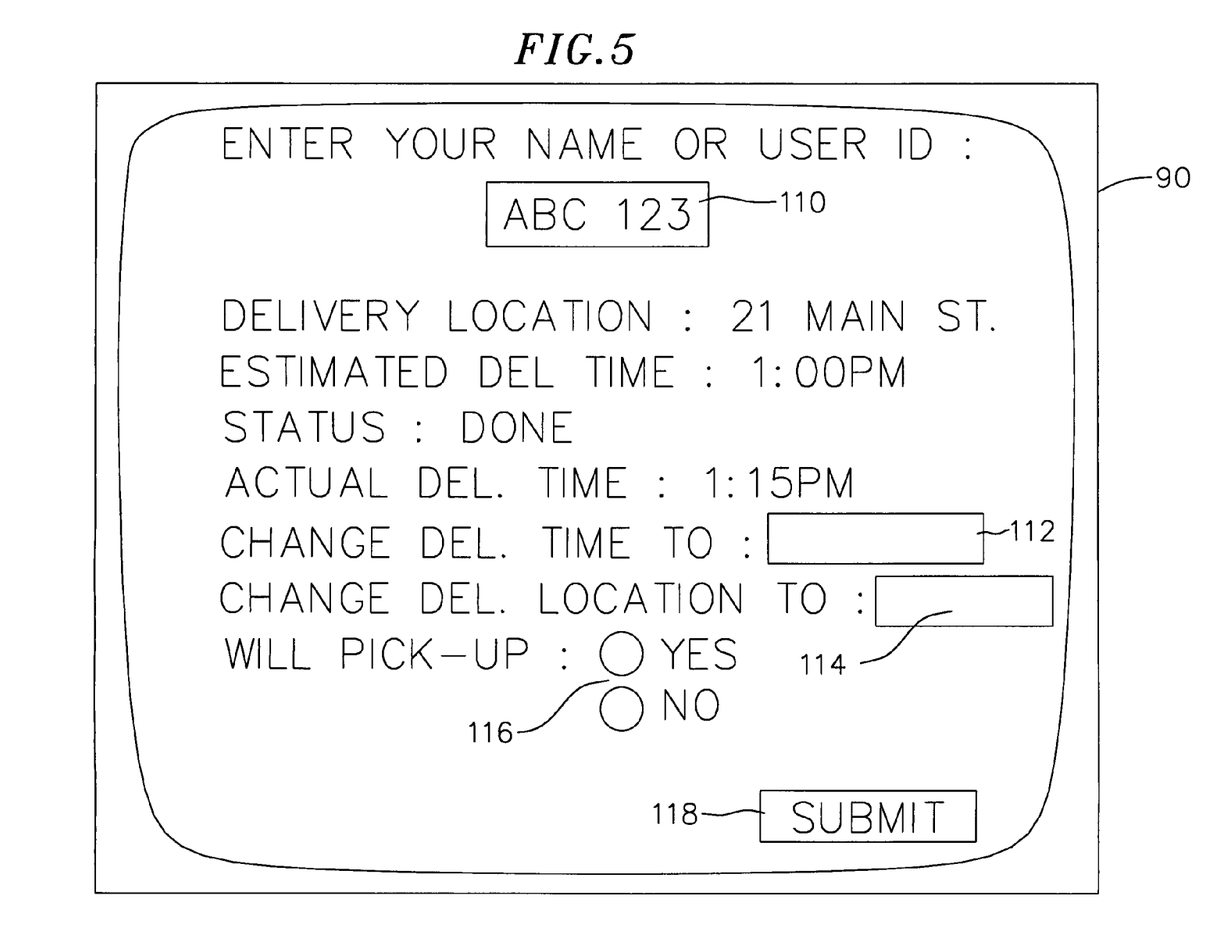
FIG. 5 is an exemplary layout of a display screen for displaying delivery schedule information to a customer.

FIG. 5 is an exemplary layout of a display screen 90 for viewing a delivery schedule over the Internet using the customer's browser-based client, HHC 18, PC 14, or television with an STB 16. According to one embodiment of the invention, the delivery scheduling computer 10 includes a set of user application modules for allowing the user to access and view the delivery schedule information, and request changes if desired. The user application modules are programmed to display a graphics user interface on the customer's screen 90 to request the customer's name and/or user ID in an information entry area 110. Alternatively, other identification information may be requested from the user, such as a delivery address, a product tracking number if such is maintained in the schedule table 50, and the like.

Upon receipt of such information, the user application modules search the schedule table for a delivery entry matching the entered information. When a match is made, the user application modules retrieve a delivery location from the delivery address field 50c and an estimated delivery time from the estimated delivery time field 50e for display on the screen 90. Other information such as the status of the delivery or an actual delivery time may also be displayed to the user.

A change to a delivery time is made by entering a new time in a time entry area 112. Similarly, a change to a delivery location is made by entering a new location in a location entry area 114. Otherwise, if the customer wants to pick-up the goods scheduled to be delivered, the customer checks a YES option 116 on the screen. Actuation of a submit button 118 transmits the changes to the delivery scheduling computer 10.

Figure 6:
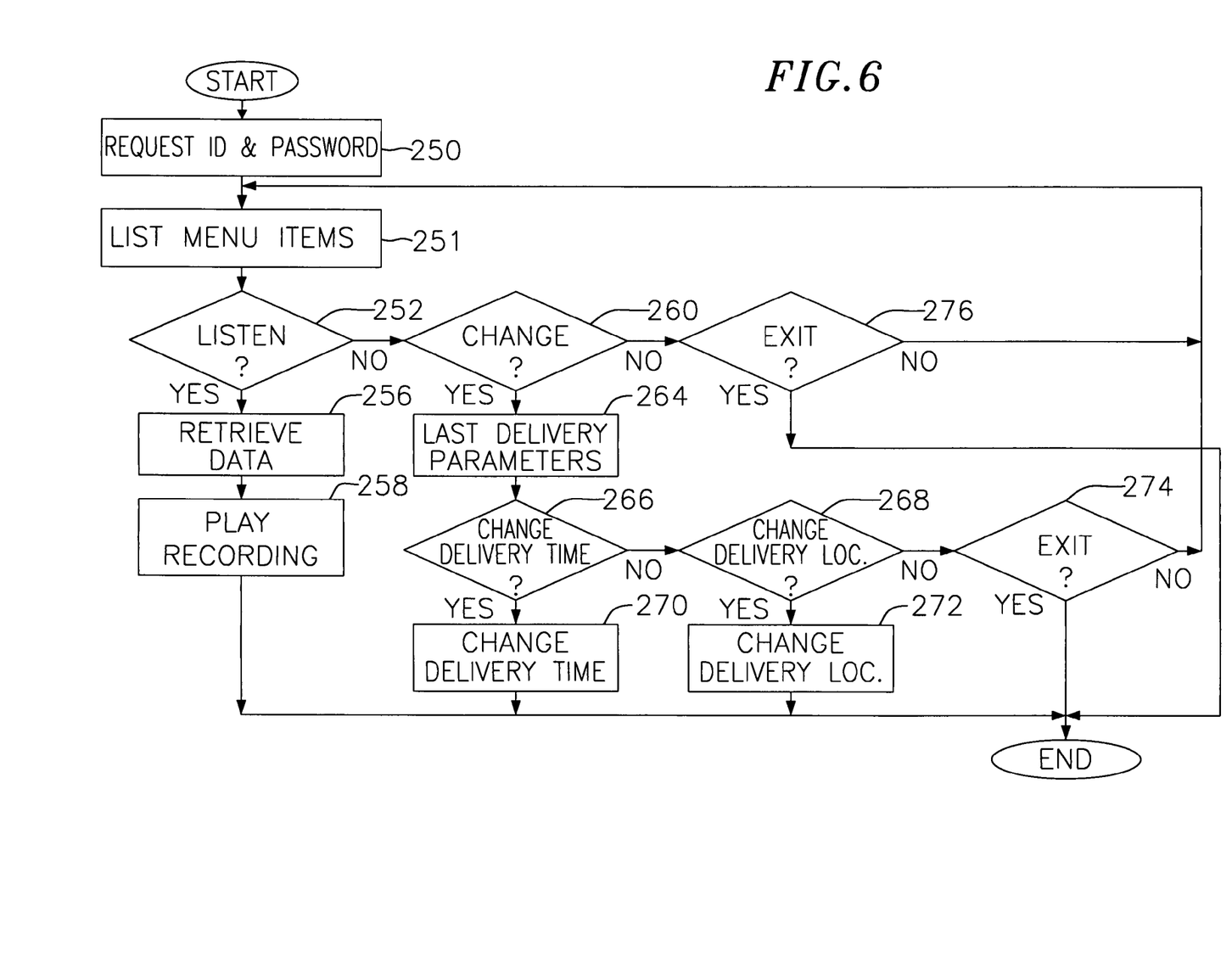
FIG. 6 is a flow diagram of a touch-tone response program for delivering and receiving delivery change requests over the phone.

The customer may also access the delivery schedule information and make changes to delivery parameters, by accessing the delivery scheduling computer's CTI server 35 using the telephone 22 or cellular phone 26. FIG. 6 is a flow diagram of a touch-tone response program according to one embodiment of the invention. The program starts upon detection of an incoming telephonic call on the delivery scheduling computer's phone line. In step 250, the program requests a client ID and password for authenticating the user. If the user has been authenticated, the program, in step 251, plays a pre-recorded message of the various menu options available to the customer. For instance, the audio recording might state: "Please press 1 to listen to a scheduled delivery; press 2 to change a scheduled delivery; or press 3 to exit the system."

In step 252, the program determines if the customer has chosen to listen information about a scheduled delivery. If the answer is YES, the program, in step 256, retrieves the estimated delivery time, location, status, and/or actual delivery time for the client ID from the schedule table 50. In step 258, program selects one or more appropriate audio recordings corresponding to the retrieved data, and plays the retrieved recordings to the customer.

In step 260, the program determines if the customer has chosen to change a scheduled delivery. If the answer is YES, the program, in step 264, plays a pre-recorded recording of the delivery parameters that the customer may change. In step 266, the program determines if the customer has selected to change a delivery time and if so, changes to the delivery time are made in step 270. In step 268, the program determines if the customer has selected to change a delivery location and if so, changes the delivery location are made in step 272. The program ends upon a determination in steps 274 or 276 that the user has selected an exit option.

Accordingly, there has been brought to the art of delivery scheduling systems, a system and method that allows constant monitoring, updating, and prior notifications to customers of deliveries waiting to be delivered. Estimated delivery times are calculated and transmitted to the customers prior to the actual delivery. Customers therefore need to be at the delivery location only during the times in which a delivery is expected to be made, instead of waiting endlessly for the delivery. If the customer is not at the scheduled delivery location when a delivery is scheduled to be made, the customer may alter the time or location of the delivery.

While the invention has been described with respect to particular illustrated embodiments, those skilled in the art and technology to which the invention pertains will have no difficulty devising variations which in no way depart from the scope and spirit of the present invention. Accordingly, the present invention is not limited to the specific embodiments described above, but rather, is defined by the scope of the appended claims.

The invention claimed is:

1. A delivery scheduling and updating system comprising:
a delivery scheduling computer electronically maintaining real-time delivery schedule information and delivering a selected portion of the information to a remote customer;
a user computer accessible to the remote customer for receiving the selected portion of the delivery schedule information and transmitting a delivery change request to the delivery scheduling computer;
a set of user application modules associated with the delivery scheduling computer and user computer for allowing the customer to view the selected portion of the delivery schedule information and enter the delivery change request;
means for automatically recomputing a delivery sequence based on the delivery change request; and
means for transmitting the recomputed delivery sequence to a delivery employee, the delivery employee delivering the goods according to the recomputed delivery sequence.

2. The system of claim 1, wherein the selected portion of the delivery schedule information comprises an estimated delivery time and a delivery location.

3. The system of claim 2, wherein the delivery change request includes a request to change the estimated delivery time.

4. The system of claim 2, wherein the delivery change request includes a request to change the delivery location.

5. The system of claim 1, wherein the user computer is a wired terminal.

6. The system of claim 1, wherein the user computer is a wireless terminal.

7. The system of claim 1, wherein the user computer is a browser-based client.

8. The system of claim 1 further including an employee computer accessible to a delivery employee for receiving the real-time delivery schedule information from the delivery scheduling computer, wherein the network links the delivery scheduling computer to the employee computer.

9. The system of claim 8, wherein the employee computer transmits a delivery completion message to the delivery scheduling computer upon completion of a scheduled delivery, the delivery completion message including an actual delivery time.

10. The system of claim 9, wherein the delivery scheduling computer updates the estimated delivery time of remaining deliveries based on the actual delivery time.

11. A delivery scheduling and updating system comprising:
a delivery scheduling computer electronically maintaining real-time delivery schedule information and transmitting the real-time delivery schedule information to a delivery employee, the delivery scheduling computer further transmitting a selected portion of the delivery schedule information to a remote customer, the selected portion of the delivery schedule information notifying the customer of a scheduled delivery;
an employee computer accessible to the delivery employee for receiving the real-time delivery schedule information from the delivery scheduling computer and for transmitting a delivery completion message to the delivery scheduling computer upon completion of the scheduled delivery, the delivery completion message including an actual delivery time; and
a user computer accessible to the remote customer for receiving the selected portion of the delivery schedule information from the delivery scheduling computer;
a set of user application modules associated with the delivery scheduling computer and the user computer for allowing the customer to view the selected portion of the delivery schedule information and enter a delivery change request, wherein the delivery scheduling computer automatically recomputes a delivery sequence based on the delivery change request and transmits the recomputed delivery sequence to the employee computer, the delivery employee delivering the goods according to the recomputed delivery sequence.

12. The system of claim 11, wherein the selected portion of the delivery schedule information comprises an estimated delivery time and a delivery location.

13. The system of claim 12, wherein the delivery scheduling computer receives the delivery completion message and updates the estimated delivery time of remaining deliveries based on the actual delivery time included in the delivery completion message.

14. The system of claim 11, wherein the employee computer is a wired terminal.

15. The system of claim 11, wherein the employee computer is a wireless terminal.

16. The system of claim 11, wherein the employee computer is a browser-based client.

17. A delivery notification computer in a computer network enabling communication with a remote customer and a remote delivery employee, the delivery notification computer comprising:
a memory for storing real-time delivery schedule information;
a processor coupled to the memory for creating and updating the real-time delivery schedule information;
a network connection coupled to the processor for transmitting a selected portion of the delivery schedule information to the remote customer and for receiving a delivery change request from the customer;
a set of user application modules for allowing the customer to view the selected portion of the delivery schedule information and enter the delivery change request;
means for automatically recomputing a delivery sequence based on the delivery change request; and
means for transmitting the recomputed delivery sequence to a delivery employee, the delivery employee delivering the goods according to the recomputed delivery sequence.

18. The delivery notification computer of claim 17, wherein the network connection further receives a delivery completion message from the remote delivery employee upon completion of the scheduled delivery, and wherein the processor updates the estimated delivery time of remaining deliveries based on the actual delivery time.

19. A delivery notification computer in a computer network enabling communication with a remote customer, the delivery notification computer comprising:
a memory for storing real-time delivery schedule information;
a network connection coupled to the memory for transmitting the real-time delivery schedule information to a delivery employee and a selected portion of the delivery schedule information to a remote customer, the selected portion of the delivery schedule information notifying the customer of a scheduled delivery, the network connection further receiving a delivery completion message from the delivery employee upon completion of the scheduled delivery, the delivery completion message including an actual delivery time, and the network connection further receiving a user-entered delivery change request; and
a processor coupled to the memory and the network connection for creating the real-time delivery schedule information and updating portions of the delivery schedule information based on the actual delivery time, the processor further automatically recomputing a delivery sequence based on the delivery change request and transmitting the recomputed delivery sequence to a delivery employee computer, the delivery employee delivering the goods according to the recomputed delivery sequence.

20. A delivery notification computer in a computer network enabling communication with a remote customer and a remote delivery employee, the delivery notification computer comprising:
means for creating delivery schedule information for a plurality of deliveries;
means for updating the delivery schedule information for real-time maintenance of the delivery schedule information;
means for transmitting a selected portion of the delivery schedule information to a remote customer, the selected portion of the delivery schedule information notifying the customer of a scheduled delivery;
means for receiving a delivery change request from the customer for modifying the delivery schedule information;
means for automatically recomputing a delivery sequence based on the delivery change request; and
means for transmitting the recomputed delivery sequence to a delivery employee, the delivery employee delivering the goods according to the recomputed delivery sequence.

21. The computer of claim 20, wherein the means for creating the delivery schedule information comprises means for creating the delivery schedule information based on a shortest-path algorithm.

22. The computer of claim 20, wherein the delivery change request includes a request to change the estimated delivery time.

23. The computer of claim 20, wherein the delivery change request includes a request to change the delivery location.

24. The computer of claim 20 further comprising means for recalculating a delivery cost based on the delivery change request.

25. The computer of claim 20 further comprising means for transmitting the delivery schedule information to a delivery employee.

26. The computer of claim 25 further comprising means for receiving a delivery completion message of a particular delivery from the delivery employee, the delivery completion message including an actual delivery time.

27. The computer of claim 20 wherein the means for transmitting further comprises means for determining when the selected portion of the delivery schedule information is to be transmitted to the remote customer.

28. A computerized delivery scheduling and updating method comprising:
creating a delivery schedule for a plurality of deliveries;
updating the delivery schedule for real-time maintenance of the delivery schedule;
transmitting a selected portion of the delivery schedule to a remote customer, the selected portion of the delivery schedule notifying the customer of a scheduled delivery;
receiving over a computer connection a delivery change request from the customer;
modifying the delivery schedule based on the delivery change request;
automatically recomputing a delivery sequence based on the delivery change request; and transmitting the recomputed delivery sequence to a delivery employee, the delivery employee delivering the goods according to the recomputed delivery sequence.

29. The method of claim 28, wherein the creating the delivery schedule information comprises creating the delivery schedule information based on a shortest-path algorithm.

30. The method of claim 28, wherein the delivery change request includes a request to change the estimated delivery time.

31. The method of claim 28, wherein the delivery change request includes a request to change the delivery location.

32. The method of claim 28 further comprising the step of recalculating a delivery cost based on the delivery change request.

33. The method of claim 28 further comprising transmitting the delivery schedule information to a delivery employee.

34. The method of claim 33 further comprising receiving a delivery completion message of a particular delivery from the delivery employee, the delivery completion message including an actual delivery time.

35. The method of claim 34 further comprising modifying the delivery schedule information based on the actual delivery time.

36. The method of claim 28 further comprising determining when the selected portion of the delivery schedule information is to be transmitted to the remote customer.

* * * * *